United States Patent Office 3,845,016
Patented Oct. 29, 1974

3,845,016
THERMOSET MOLDING POWDERS EMPLOYING GLYCIDYL METHACRYLATE-FUNCTIONAL POLYMERS AND POLYMERIC POLYANHYDRIDE CROSSLINKING AGENTS AND MOLDINGS THEREOF
Santokh S. Labana, Dearborn Heights, and Ares N. Theodore, Farmington, Mich., assignors to Ford Motor Company, Dearborn, Mich.
No Drawing. Continuation of abandoned application Ser. No. 209,347, Dec. 17, 1971. This application Feb. 15, 1974, Ser. No. 443,183
Int. Cl. C08f 45/10
U.S. Cl. 260—42.18    26 Claims

ABSTRACT OF THE DISCLOSURE

Novel thermosetting resin powders which can be molded to form products characterized, in flexural measurement, by relatively high elongation-to-break, strength and modulus and by a high glass transition temperature are prepared from a mixture of an epoxy-functional prepolymer consisting essentially of acrylic monomers and a polymeric polyanhydride crosslinking agent.

---

This is a continuation of application Ser. No. 209,347, filed Dec. 17, 1971, now abandoned.

This invention relates to self-crosslinking, dry thermosettable molding powders suitable for rapid curing during processing as by compression and injection molding and applicable to the production of rigid, tough, structural materials as, for instance, automobile body panels, electrical appliance housings, boat construction, storage tanks, conduits, particularly those for the transmission of heated fluids, etc., and to molded articles produced therefrom.

The thermosets of this invention comprise an epoxy-functional prepolymer formed from vinyl monomers and a polymeric polyanhydride crosslinking agent. The polymeric polyanhydride produces a distinctly different thermoset system from that provided by the same prepolymer and a monomeric anhydride and the use of polymeric polyanhydrides in a thermoset system provides a number of advantages over the use of monomeric anhydrides. Some of these advantages are as follows: (a) Relative to processing, polyanhydrides are surprisingly found to be more readily miscible with polymers than are monomeric anhydrides. Generally, polyanhydrides are lower melting than monomeric anhydrides and can be blended with polymers at lower temperatures. Monomeric anhydrides tend to sublime whereas polymeric anhydrides do not. As a result, when a mold containing heated and unreacted molding materials is opened fumes are often generated when monomeric anhydrides are used as the crosslinking agent. (b) Relative to product, polyanhydrides impart greater flexibility to the moldings than do monomeric anhydrides.

The thermosets of this invention, after molding, have a glass transition temperature above 90° C., preferably above 120° C. At room temperature (20°–25° C.) these moldings exhibit, in flexural measurement, a strength in the range of about 16,000 to about 30,000 p.s.i. or higher, a modulus in the range of about 1.2–2.25×10$^6$ p.s.i. or higher and elongation-to-break in the range of about 1 to about 3% or higher.

Glass transition temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g., about 1 cycle per second.

I. Composition of the Prepolymer

The prepolymer has at least three constituent monomers and, except for limited substitution as herein after noted, has the following basic composition:

glycidyl methacrylate, 15–40, preferably 20–35 wt. percent
methacrylonitrile, 0–30, preferably 10–25 wt. percent
methyl methacrylate, balance Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than ⅓ thereof, may be replaced with styrene, alpha methyl styrene, vinyl acetate or a different ester of acrylic or methacrylic acid and a monohydric alcohol, preferably a $C_2$–$C_4$ alcohol, e.g., ethyl acrylate, butyl acrylate, butyl methacrylate, etc. This substitute should not exceed about 15 percent of the total monomers used to form the prepolymer and preferably does not exceed 10% of the same. In the case of the $C_4$ substitutes, this component preferably does not exceed ⅓ of the methyl methacrylate. The substitutes mentioned in this paragraph, with the exception of styrene, increase the flexibility of the polymer, i.e., the elongation-to-break factor, and decrease the softening point (glass transition temperature).

II. Properties of the Prepolymer

The prepolymer has an average molecular weight in the range of about 1,500 to about 16,000, preferably about 2,000 to about 10,000, and more preferably about 3,500 to about 8,000, as determined by vapor phase osmometry using methyl ethyl ketone as solvent. Less than about 5% of the molecules thereof should have a molecular weight below about 1,000.

The prepolymer has a softening point above 25° C., preferably in the range of about 50° to about 110° C.

III. Preparation of the Prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 wt. percent of the combined monomer weight. Conventional free radical initiators are suitable for this purpose, e.g., acrylperoxides, peresters, and azo compounds. Specific materials which have been used successfully include 2,2′-azobis (2-methyl propionitrile) hereinafter termed AIBN, benzoyl peroxide, 5-butyl perbenzoate, and t-butyl peroxypivalate.

As aforementioned, the reaction is carried out in an inert solvent, e.g., toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g., dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner. The reaction solution is further diluted with additional solvent until the prepolymer comprises about 20 to about 30 weight percent of the resultant solution. This solution is then added slowly to a liquid that will effect precipitation of the prepolymer. In this instance, hexane is quite suitable. A fine powder precipitates. This is recovered by filtration, dried, and if necessary, broken up by rolling or grinding.

In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100—Rohm & Haas Co.) have been found quite satisfactory. To carry out suspension polymerization, the monomer mixture is added to cooled (about 0° C.) 0.16% solution of polyvinyl alcohol in water. The mixture is stirred rapidly and the initiator added over a period of about 30 minutes. The temperature of the reaction mixture is then controlled to remain between 55° and 60° C. for six to eight hours. After cooling to room temperature, the polymer is collected by filtration. Because the polymerization must be carried out below 65° C., only the initiators which are an efficient source of free radicals below this temperature may be used. Suitable initiators for suspension polymerization include t-butyl peroxypivalate and diisopropyl peroxycarbonate. The molecular weight of the prepolymer can be controlled, among other ways, by using 0.1 to about 5 weight percent (based on monomer weight of a chain transfer agent such as lauryl mercaptan.)

IV. Crosslinking Agent

The crosslinking agent of the thermoset system is a polymeric polyanhydride of the formula

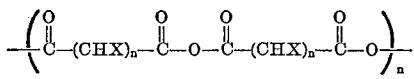

wherein X=H, $CH_3$, $C_2H_5$, or a halogen atom and $n$ is 4 to 10. These limits are exemplified by polyadipic polyanhydride ($n=4$) and polysebacic polyanhydride ($n=10$). The value of $n$ is such that molecular weight of the polyanhydride is in the range of 1,000 to 5,000.

The anhydride crosslinking agent is employed in sufficient quantity to provide about 0.5 to about 1.5, preferably 0.6 to 0.9, anhydride groups per each epoxy group in the prepolymer used.

An anhydride to epoxy ratio within the preferred range has been found to give the best combination of strength properties and glass transition temperature.

V. Partial Replacement for Prepolymer With Epoxy Compound

A minor portion, i.e., about 2 to about 20 percent, of the epoxy groups provided by the prepolymer may be replaced by substituting for that amount of the prepolymer an epoxy compound having at least two epoxy groups, preferably a diepoxide.

These diepoxides should be liquid at 140° C. or below and have molecular weight in the range of about 300 to about 4,000 and viscosity at 140° C. of less than 50 poises.

The diepoxide may be an aromatic, an acyclic aliphatic or a cycloaliphatic diepoxide. Such diepoxides should consist essentially of carbon, hydrogen and oxygen but may have substituents which do not interfere with the crosslinking reactions, e.g., sulfonyl groups, nitro groups, alkylthio groups and halogens.

These diepoxides are well known in the art and many are commercially available. Typical examples include diglycidyl esters of polybasic or dibasic acids as disclosed in United States Pat. No. 2,866,767; diglycidyl ethers of dihydric phenols as disclosed in United States Pat. Nos. 2,467,171; 2,506,486; 2,640,037; and 2,841,595; diglycidyl ethers of diols as disclosed in United States Pat. Nos. 2,538,027 and 2,581,464 and diepoxides obtained by peracid epoxidation of dienes. A collection of suitable diepoxides are illustrated in U.S. Patent Application Serial No. 43,895, filed June 5, 1970 and these disclosures are incorporated herein by reference. Although the diepoxides are to be preferred for the present invention, low viscosity polyepoxides may also be advantageously used.

VI. Catalysts

A catalyst is employed in the molding powder mix to facilitate the crosslinking reaction. Quarternary ammonium salts exhibit a high degree of specificity for the epoxyanhydride reaction. These include tetrabutyl ammonium iodide, chloride, bromide, tetraethyl ammonium iodide, chloride and bromide, tetramethyl ammonium bromide, chloride and iodide, benzyl trimethyl ammonium iodide, chloride and bromide, benzyl dimethyl phenyl ammonium chloride, bromide and iodide, stearyl dimethyl benzyl ammonium iodide, bromide and chloride, etc. Catalysts of this type are useful at levels of about 0.05 to about 1.0 wt. percent of the combined reactants.

Other catalysts which may be used include solid tertiary amines such as triethylene diamine, amine salts such as trimethylamine-p-toluene sulfonate or imidazoles such as 2-ethyl-4-methyl imidazole or metal carboxyletes such as lithium benzoate. Catalysts of these types are useful at the same concentration levels above set forth.

These catalysts are found to be latent catalysts for anhydride-epoxy reactions. That is to say that the catalysts do not significantly enhance the rate of reaction at room temperature but are effective only above certain temperatures. The catalysts that are latent up to at least 50° C. are preferred.

VII Preparation of the Molding Powder Mix

The powdered prepolymer, the crosslinking agent and the catalyst are dissolved in a suitable solvent, e.g., acetone, methylene chloride, benzene, etc., and the solution is thoroughly stirred. The solvent is evaporated under vacuum leaving a solid cake which is crushed to a fine powder. The powder is further dried under vacuum so that it contains less than one percent of the solvent.

Alternatively, to the prepolymer solution as obtained by polymerization are added crosslinking agent and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, crosslinking agent, and catalyst and homogenizing by passing through an extrusion mixer or a roll mill.

If desired, reinforcing fillers such as asbestos, glass fibers, clay, calcium carbonate, calcium silicate, etc., may also be incorporated in the molding powders. A particularly effective filler is calcium metasilicate ($CaSiO_3$).

The powders thus prepared are suitable for use in injection molding, compression molding and transfer molding.

This invention will be more fully understood from the following illustrative examples wherein flexural properties of the molded specimens are determined by Flexural Test, American Society of Testing & Materials, D 790–

1966. In this test rectangular bars having thickness ⅛ inch, width 0.500–0.600 inch and length 4 inches are used for determining the flexural properties. A table model Instron mechanical testing machine is used herein for testing. It is set up at a crosshead speed of 0.04 in./min. and a recorder chart speed of 2 inches/min. The formulas in procedure B (ASTM–D 790–66) are used for the calculation of Flexural Modulus, Elongation-To-Break and Strength.

The prepolymers in the foregoing illustrative examples have softening points between 50° and 110° C. with less than 5% of the molecules thereof having molecular weight below 1,000. The molded and reinforced articles have glass transition temperatures above 90° C., flexural strength above about 16,000 p.s.i., flexural modulus above $1.2 \times 10^6$ p.s.i. and elongation-to-break above 1 percent.

Example 1

A prepolymer is prepared from the following components in the manner hereinafter set forth:

| Reactants | Amount (gms.) | Percent |
|---|---|---|
| Glycidyl methacrylate | 532 | 31 |
| Methyl methacrylate | 870 | 50.5 |
| Methacrylonitirle | 318 | 18.5 |

AIBN, i.e., 2,2′-azobis-(2-methylpropionitrile), in the amount of 54 grams (3%) is added to the monomer mixture. This solution is added dropwise over a 4 hour period into 1950 ml. toluene at 108°–111° C. under nitrogen atmosphere. Then 2.0 grams of AIBN dissolved in 20 ml. acetone are added over ½ hour period and refluxing continued for 3 additional hours.

The polymer solution is diluted with 3,000 ml. acetone and coagulated in hexane. The white powder is dried in a vacuum oven at 70° C. for 35 hours. Its molecular weight is found to be $M_w/M_n=6231/3466$ with a molecular weight per epoxide unit, hereinafter referred to as WPE, of 496.

The prepolymer is used in the preparation of molding powder. The molding powder is made by combining 25.0 grams of this prepolymer with 9.0 grams of polyazelaic polyanhydride and 0.051 grams benzyl trimethyl ammonium iodide. After dry blending the ingredients by ballmilling for 15 hours, 28.0 grams of molding powder were processed with 32.0 grams calcium metasilicate ($CaSiO_3$) and 20.0 grams of chopped glass fibers (average length ¼ inch—the same length is used in all other examples hereinafter set forth). After combining the molding powder with the chopped glass fibers, the mixture is tumbled. This ensures mixing all components without fiber damage. Then a preform is made for molding.

A sheet (4.7 x 5.2 x ⅛ inches—all sheets molded in succeeding examples are of these dimensions) is molded from this powder and fiber mix by compressing the mix at a pressure of 1,500 p.s.i. at a temperature of 380° F. for 30 minutes.

Example 2

The procedure of Example 1 is repeated with the difference that the polyazelaic polyanhydride is replaced with an equimolar amount of polyadipic polyanhydride.

Example 3

The procedure of Example 1 is repeated with the difference that the polyazelaic polyanhydride is replaced with an equimolar amount of polysebacic polyanhydride.

Example 4

The procedure of Example 1 is repeated except that an amount of the prepolymer providing 2% of the epoxy groups is replaced with a diepoxide in an amount providing the same number of epoxy groups. This diepoxide has the following properties: melting point about 64–76° C., epoxide equivalent about 450–525, and average molecular weight of about 900. This diepoxide is represented by the following structural formula wherein $n=2$.

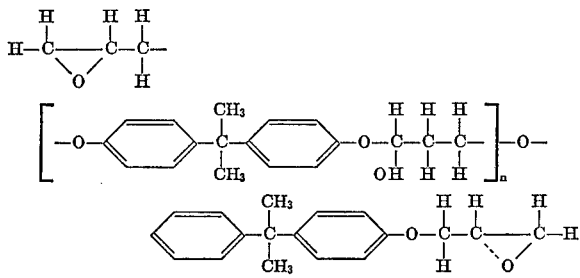

The diepoxide is first mixed with the polymeric polyanhydride. After melting the solid epoxy resin, the polyanhydride is added with stirring, and weight percent, basis total weight of diepoxide and polyanhydride. The temperature is maintained at about 90°–100° C. for 1 hour. The adduct-blend is allowed to cool and then ground to a fine powder. The powder is then mixed with the prepolymer and processed in the identical manner used in Example 1 and then compression molded using the identical conditions used in Example 1.

Example 5

The procedure of Example 4 is repeated with the difference that an amount of the prepolymer providing 10% of the epoxy groups is replaced with the dipoxide used in Example 4 in an amount providing the same number of epoxy groups.

Example 6

The procedure of Example 4 is repeated with the difference that an amount of the prepolymer providing 20% of the epoxy groups is replaced with the diepoxide used in Example 4 in an amount providing the same number of epoxy groups.

Example 7

The procedures of Examples 4, 5 and 6 are repeated with the difference that equimolar amounts of an aliphatic diepoxide are substituted for the aromatic diepoxide. This aliphatic diepoxide is synthesized in the following manner: to a 2,000 ml, 3-neck flask equipped with stirrer, dropping funnel, thermometer and nitrogen inlet, is added 1 mole of 2,3-butanediol (91.12 gms.) and 4 moles of epichlorohydrin (370 gms.). The temperature at 110° C. while 2 moles sodium hydroxide (80.0 gms.) is added dropwise as a 30% aqueous solution. The rate of addition is regulated so that the reaction mixture remains neutral. After about 3 hours, the organic layer is separated, dried, distilled, and a polymer is recovered. This polymeric product is represented by the following structural formula:

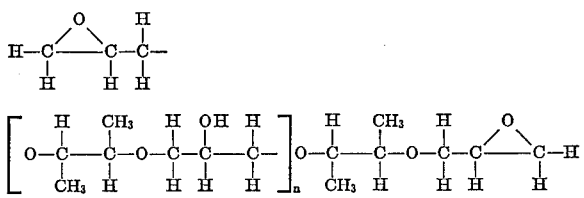
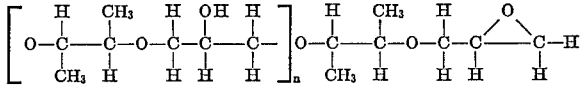

Example 8

The procedures of Examples 1–4 are repeated with the difference that the prepolymer is formed from 40 weight percent glycidyl methacrylate and 60 weight percent methyl methacrylate and the quantity of the polymeric polyanhydride used is adjusted to compensate for the number of epoxy groups in the prepolymer.

Example 9

The procedures of Examples 1–4 are repeated except for the difference that the prepolymer is formed from 35 weight percent gylcidyl methacrylate, 25 weight percent methacrylonitrile and 40 weight percent methyl methacrylate and the quantity of the polymeric polyanhydride used is adjusted to compensate for the change in the number of epoxy groups in the prepolymer.

Example 10

The procedures of Examples 1–4 are repeated with the difference that the prepolymer is formed from 30 weight percent glycidyl methacrylate, 20 weight percent methacrylonitrile and 50 weight percent methyl methacrylate and the quantity of polymeric polyanhydride used is adjusted to compensate for the change in the number of epoxy groups in the prepolymer.

Example 11

The procedure of Example 1 is repeated with the difference that the prepolymer is formed from 30 weight percent glycidyl methacrylate, 20 weight percent acrylonitrile and 50 weight percent methyl methacrylate and the quantity of polymeric polyanhydride used is adjusted to compensate for the change in the number of epoxy groups in the prepolymer.

Example 12

The procedures of Examples 1–4 are repeated with the difference that the prepolymer is formed from 20 weight percent glycidyl methacrylate, 25 weight percent methacrylonitrile, 5 weight percent butyl acrylate, 5 weight percent butyl methacrylate, 5 weight percent 2-ethyl hexyl acrylate and 40 weight percent methyl methacrylate and the quantity of polymeric polyanhydride used is adjusted to compensate for the change in the number of epoxy groups in the prepolymer.

Example 13

The procedures of Examples 1–4 are repeated with the difference that the prepolymer is formed from 15 weight percent glycidyl methacrylate, 30 weight percent methacrylonitrile and 55 weight percent methyl methacrylate and the quantity of polymeric polyanhydride used is adjusted to compensate for the change in the number of epoxy groups in the prepolymer.

Example 14

The procedures of Example 1–4 are repeated with the difference that the prepolymer is formed from 55 weight percent glycidyl methacrylate, 10 weight percent methacrylonitrile, 10 weight percent styrene and 45 weight percent methyl methacrylate and the quantity of polymeric anhydride is adjusted to compensate for the change in the number of epoxy groups in the prepolymer.

Example 15

The procedure of Examples 1–4 are repeated with the difference that the prepolymer is formed from 15 weight percent glycidyl methacrylate, 30 weight percent acrylonitrile and 55 weight percent methyl methacrylate and the quantity of the polymeric polyanhydride used is adjusted to compensate for the change in the number of epoxy groups in the prepolymer.

Example 16

The procedures of Examples 1–4 are repeated with the difference that the prepolymer is formed from 20 weight percent glycidyl methacrylate, 30 weight percent acrylonitrile and 50 weight percent methyl methacrylate and the quantity of the polymeric polyanhydride used is adjusted to compensate for the change in the number of epoxy groups in the prepolymer.

Example 17

The procedures of Examples 1–4 are repeated with the difference that the polymeric polyanhydride is employed in an amount which provides 0.5 anhydride groups per each epoxy group in the thermoset molding powder.

Example 18

The procedures of Examples 1–4 are repeated with the difference that the polymeric polyanhydride is employed in an amount which provides 1.5 anhydride groups per each epoxy group in the thermoset molding powder.

Example 19

The procedures of Examples 1–4 are repeated with the difference that the molecular weight ($M_n$) of the prepolymer is about 1,500.

Example 20

The procedures of Examples 1–4 are repeated with the difference that the molecular weight ($M_n$) of the prepolymer is about 2,000.

Example 21

The procedures of Examples 1–4 are repeated with the difference that the molecular weight ($M_n$) of the prepolymer is about 3,000.

Example 22

The procedures of Examples 1–4 are repeated with the difference that the molecular weight ($M_n$) of the prepolymer is about 6,000.

Example 23

The procedures of Examples 1–4 are repeated with the difference that the molecular weight ($M_n$) of the prepolymer is about 10,000.

Example 24

The procedures of Examples 1–4 are repeated with the difference that the molecular weight of the prepolymer is about 16,000.

Example 25

The procedures of Examples 1–4 are repeated except for the difference that in the production of the prepolymer 25 weight percent of the methyl methacrylate is replaced with an equimolar amount of styrene.

Example 26

The procedures of Examples 1–4 are repeated except for the difference that in the production of the prepolymer 25 weight percent of the methacrylonitrile is replaced with an equimolar amount of acrylonitrile.

Example 27

The procedures of Examples 1–4 are repeated except for the difference that in the production of the prepolymer 50 weight percent of the methacrylonitrile is replaced with an equimolar amount of acrylonitrile.

Example 28

The procedures of Examples 1–4 are repeated with the difference that in the production of the prepolymer 25 weight percent of the methyl methacrylate is replaced with an equimolar amount of alpha methyl styrene.

Example 29

The procedures of Examples 1–4 are repeated with the difference that the amount of catalyst employed in preparation of the molding powder is 0.05 weight percent of the combined weights of the reactants.

Example 30

The procedure of Example 1 is repeated with the difference that the amount of catalyst employed in preparation of the molding powder is 0.25 weight percent of the combined weights of the reactants.

Example 31

The procedure of Example 1 is repeated with the difference that the amount of catalyst employed in preparation of the molding powder is 0.5 weight percent of the combined weights of the reactants.

Example 32

The procedure of Example 1 is repeated with the difference that the amount of catalyst employed in preparation of the molding powder is 1.0 weight percent of the combined weights of the reactants.

Example 33

A prepolymer is prepared using the identical procedure used to prepare the prepolymer of Example 1 from the following monomers employed in the following monomers employed in the following proportions:

| | Wt. percent |
|---|---|
| Glycidyl methacrylate | 30 |
| Methacrylonitrile | 18 |
| Methyl methacrylate | 52 |
| AIBN | 1.2 |

Molecular weight is controlled by using 2 wt. percent (basis combined weights of reactants) of lauryl mercaptan.

The resultant prepolymer has molecular weight of $M_w/M_n = 8564/4674$ and WPE of 474. A molding powder is prepared from this prepolymer and polyazelaic polyanhydride in an amount providing about 0.9 anhydride groups per each epoxy group of the prepolymer.

Example 34

The procedures of Examples 1–4 are repeated with the difference that the benzyl trimethyl ammonium iodide is replaced by an equimolar amount of tetramethyl ammonium chloride.

Example 35

The procedures of Examples 1–4 are repeated with the difference that the benzyl trimethyl ammonium iodide is replaced by an equimolar amount of tetraethyl ammonium bromide

Example 36

The procedures of Examples 1–4 are repeated with the difference that the benzyl trimethyl ammonium iodide is replaced by an equimolar amount of tetrabutyl ammonium iodide.

Example 37

The procedures of Examples 1–4 are repeated with the difference that the benzyl trimethyl ammonium iodide is replaced by an equimolar amount of benzyl dimethyl phenyl ammonium iodide.

Example 38

A thermoset molding is prepared as in Example 1 without filler using the prepolymer, the polymeric polyanhydride, and catalyst but without the calcium metasilicate and chopped glass fibers.

Example 39

The procedures of Examples 1–4 are repeated with the difference that the polymeric polyanhydride is employed in an amount which provides 0.6 anhydride groups per each epoxy group in the thermoset molding powder.

Example 40

A monomer mixture having the following composition is prepared from the following:

| | Wt. percent |
|---|---|
| Glycidyl methacrylate | 15 |
| Methyl methacrylate | 57 |
| Isobornyl methacrylate | 28 |

Polymerization is carried out using the identical procedure used in Example 1 except that the concentration of AIBN catalyst employed is 1 wt. percent (basis weight of reactants). The resultant prepolymer has a Tg (glass transition temperature) of about 110° C. and an average molecular weight of about 8,500.

This prepolymer in the amount of 30 grams is mixed with polyazelaic polyanhydride in an amount providing about 1.0 anhydride groups per each epoxy group in the prepolymer and tetrapropyl ammonium iodide in an amount constituting 0.5 weight percent of the reactants. This mixture is dry blended by ball-milling for 15 hours and processed using the identical procedure used in Example 1 and compression molded into a sheet using the identical molding conditions employed in Example 1.

Example 41

A monomer mixture having the following composition is prepared from the following:

| | Wt. percent |
|---|---|
| Glycidyl methacrylate | 20 |
| Methyl methacrylate | 55 |
| Ethyl acrylate | 25 |

Polymerization is carried out using the identical procedure used in Example 1 except that the concentration of AIBN catalyst employed is 1 weight percent of the reactants. The resultant prepolymer has a Tg of 50° C. and an average molecular weight of about 8,500.

This prepolymer in the amount of 30 grams is mixed with polyazelaic polyanhydride in an amount providing about 1.0 anhydride group per each epoxy group in the prepolymer and tetrapropyl ammonium iodide in an amount constituting 0.5 weight percent of the combined reactants. This mixture is dry blended by ball-milling for 15 hours and processed using the identical procedure used in Example 1 and compression molded into a sheet using the identical molding conditions employed in Example 1.

Example 42

The procedure of Example 1 is repeated wtih the difference that an equimolar amount of poly 3,3'-dimethyl polyazelaic polyanhydride is substituted for the polyazelaic polyanhydride.

Example 43

The procedure of Example 1 is repeated wtih the difference that an equimolar amount of poly 2,2'-diethyl adipic polyanhydride is substituted for the polyazelaic polyanhydride.

Example 44

The procedure of Example 1 is repeated wtih the difference that an aquimolar amount of poly 2,2'-dichloro adipic polyanhydride is substituted for the polyazelaic polyanhydride.

The foregoing examples are illustrative of the invention defined in the appended claims. Those skilled in the art will be aware that modifications may be made in such examples without departing from the scope of the invention as set forth in the general disclosure and the appealed claims.

What is claimed is:

1. A molding powder which comprises a particulate, intimate mixture of
    (a) a copolymer
        (1) consisting of about 15 to about 40 weight percent glycidyl methylacrylate, about 10 to about 30 weight percent methacrylonitrile, and a remainder consisting essentially of methyl methacrylate, and
        (2) having an average molecular weight in the range of about 1,500 to about 16,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and (b) a polymeric polyanhydride having the structural formula

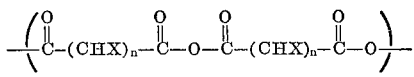

wherein X=H, CH$_2$, C$_2$H$_5$ or a halogen atom and $n$ is 4 to 10, said polymeric polyanhydride being present in an amount providing about 0.5 to about 1.5 anhydride groups per each epoxy group in the molding powder.

2. A molding powder in accordance with Claim 1 wherein said copolymer has an average molecular weight in the range of about 2,000 to about 10,000.

3. A molding powder in accordance with Claim 1 wherein said copolymer has an average molecular weight in the range of about 3,500 to about 8,000.

4. A molding powder in accordance with Claim 1 wherein said polymeric polyanhydride is selected from the group consisting of polyadipic polyanhydride, polyazelaic polyanhydride and polysebacic polyanhydride.

5. A molding powder in accordance with Claim 1 wherein said polymeric polyanhydride is employed in an amount providing about 0.6 to about 0.9 anhydride groups in the molding powder.

6. A molding powder in accordance with Claim 1 wherein, in addition to said epoxy-functional copolymer of acrylic monomers, there is employed an epoxy-functional compound including at least two epoxy groups which has a molecular weight in the range of about 300 to about 4,000 and a viscosity at 140° C. of less than 50 poises, said epoxy-functional compound being of different composition than said copolymer and being employed in an amount providing about 2 to about 20 percent of the epoxy groups in said molding powder.

7. A molding powder in accordance with Claim 1 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

8. A molding powder in accordance with Claim 1 wherein at least a minor portion but not more than ⅓ of said methyl methacrylate is replaced with a monomer selected from the group consisting of styrene, alpha-methyl styrene, vinyl acetate and an ester of acrylic or methacrylic acid and a monohydric alcohol other than methanol.

9. A molding powder in accordance with Claim 1 wherein particulate, reinforcing filler is intimately dispersed with said copolymer and said polymeric polyanhydride.

10. A molding powder which comprises a particulate, intimate mixture of
(a) a copolymer
  (1) consisting of about 20 to about 35 weight percent glycidyl methacrylate, about 10 to about 25 weight percent methacrylonitrile, and a remainder consisting essentially of methyl methacrylate, and
  (2) having an average molecular weight in the range of about 2,000 to about 10,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and
(b) a polymeric polyanhydride having the structural formula

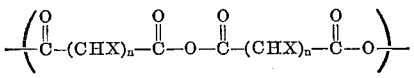

wherein X=H, CH$_2$, C$_2$H$_5$ or a halogen atom and $n$ is 4 to 10, said polymeric polyanhydride being present in an amount providing about 0.6 to about 0.9 anhydride groups per each epoxy group in the molding powder.

11. A molding powder in accordance with Claim 10 wherein said copolymer has an average molecular weight in the range of about 3,500 to about 8,000.

12. A molding powder in accordance with Claim 10 wherein said polymeric polyanhydride is selected from the group consisting of polyadipic polyanhydride, polyazelaic polyanhydride and polysebacic polyanhydride.

13. A molding powder in accordance with Claim 10 wherein said polymeric polyanhydride is employed in an amount providing about 0.6 to about 0.9 anhydride groups in the molding powder.

14. A molding powder in accordance with Claim 10 wherein, in addition to said epoxy-functional copolymer of acrylic monomers, there is employed a diepoxide of different composition than said copolymer which has a molecular weight in the range of about 300 to about 4,000 and a viscosity at 140° C. of less than 50 poises, said diepoxide being employed in an amount providing about 2 to about 20 percent of the epoxy groups in said molding powder.

15. A molding powder in accordance with Claim 10 wherein at least a minor portion but not more than ⅓ of said methyl methacrylate is replaced with a monomer selected from the group consisting essentially of styrene, alpha-methyl styrene, vinyl acetate and an ester of acrylic or methacrylic acid and a monohydric alcohol other than methanol.

16. A molding powder in accordance with Claim 10 wherein particulate reinforcing filler and glass fibers are intimately dispersed with said copolymer and said polymeric polyanhydride.

17. A molded article having a glass transition temperature above 90° C., a flexural strength above about 16,000 p.s.i., flexural modulus above about $1.2 \times 10^6$ p.s.i. and elongation-to-break above 1 percent and formed from a molding powder which comprises a particulate intimate mixture of
(a) a copolymer
  (1) consisting of about 15 to about 40 weight percent glycidyl methacrylate, about 10 to about 30 weight percent methacrylonitrile and a remainder consisting essentially of methyl methacrylate, and
  (2) having an average molecular weight in the range of about 1,500 to about 16,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and
(b) a polymeric polyanhydride having the structural formula

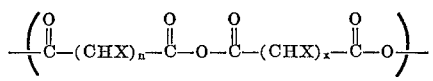

wherein X=H, CH$_2$, C$_2$H$_5$ or a halogen atom and $n$ is 4 to 10, said polymeric polyanhydride being present in an amount providing about 0.5 to about 1.5 anhydride groups per each epoxy group in the molding powder.

18. A molded article in accordance with Claim 17 wherein said copolymer has an average molecular weight in the range of about 2,000 to about 10,000.

19. A molded article in accordance with Claim 17 wherein said copolymer has an average molecular weight in the range of about 3,500 to about 8,000.

20. A molded article in accordance with Claim 17 wherein said polymeric polyanhydride is selected from the group consisting of polyadipic polyanhydride, polyazelaic polyanhydride and polysebacic polyanhydride.

21. A molded article in accordance with Claim 17 wherein said polymeric polyanhydride is employed in an amount providing about 0.6 to about 0.9 anhydride groups in the molding powder.

22. A molded article in accordance with Claim 17 wherein, in addition to said epoxy-functional copolymer of acrylic monomers, there is employed an epoxy-functional compound including at least two epoxy groups and which has a molecular weight in the range of about 300 to about 4,000 and a viscosity at 140° C. of less than 50 poises, said epoxy-functional compound being of different composition than said copolymer and being employed in an amount providing about 2 to about 20 percent of the epoxy groups in said molding powder.

23. A molded article in accordance with Claim 17 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

24. A molded article in accordance with Claim 17 wherein at least a minor portion but not more than ⅓ of said methyl methacrylate is replaced with a monomer selected from the group consisting of styrene, alpha-methyl styrene, vinyl acetate and an ester of acrylic or methacrylic acid and a monohydric alcohol other than methanol.

25. A molded article in accordance with Claim 17 wherein said article contains particulate reinforcing filler which is intimately dispersed with said copolymer and said polymeric polyanhydride.

26. A molded article in accordance with Claim 17 wherein said article contains glass fibers which are intimately dispersed with said copolymer and said polymeric polyanhydride.

References Cited
UNITED STATES PATENTS

| | | | |
|---|---|---|---|
| 2,580,901 | 1/1952 | Erickson et al. | 260—80.72 |
| 3,114,731 | 12/1963 | Rumscheidt et al. | 260—47 EA |
| 3,405,088 | 12/1968 | Slocum | 260—41 A |
| 3,201,497 | 8/1965 | Heino | 260—80.72 X |
| 2,556,075 | 6/1951 | Erickson | 260—80.72 X |
| 3,652,476 | 3/1972 | Fellers et al. | 260—80.72 X |

OTHER REFERENCES

Lee et al., Handbook of Epoxy Resins, McGraw-Hill Book Co., 1967, pp. 12-3, 4; 15–19, 20, 16-3, 5,7; Sci. Lib. TP 1180 E6L4.

LEWIS T. JACOBS, Primary Examiner

U.S. Cl. X.R.

260—80.72, 837